E. E. HIGLEY.
HOPPLE.
APPLICATION FILED JUNE 10, 1920.
1,388,465.
Patented Aug. 23, 1921.
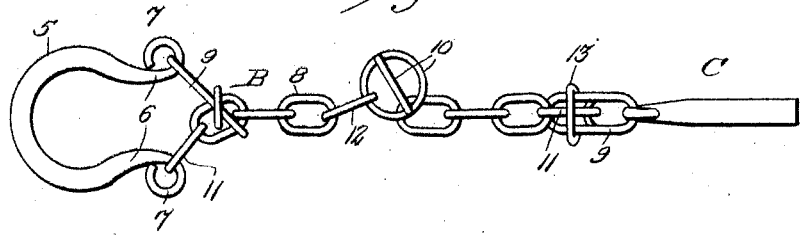
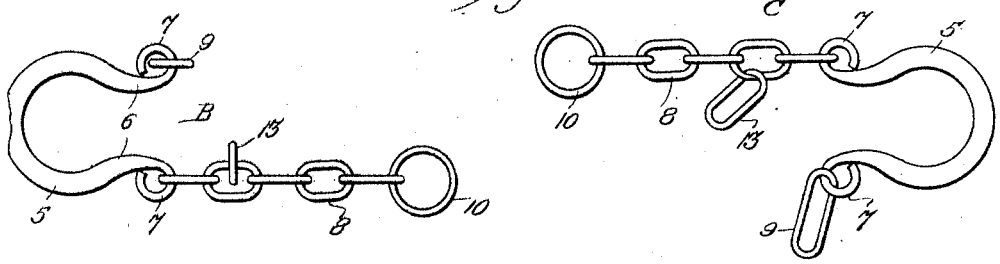
WITNESSES
J. H. Crawford
INVENTOR
E. E. Higley,
BY
ATTORNEYS

UNITED STATES PATENT OFFICE.

ELLIS ERVIN HIGLEY, OF SALMON, IDAHO.

HOPPLE.

1,388,465.  Specification of Letters Patent.  Patented Aug. 23, 1921.

Application filed June 10, 1920. Serial No. 387,905.

*To all whom it may concern:*

Be it known that I, ELLIS ERVIN HIGLEY, a citizen of the United States, and a resident of Salmon, in the county of Lemhi and State of Idaho, have invented certain new and useful Improvements in Hopples, of which the following is a specification.

This invention relates to an improved animal hopple especially adapted for use with horses.

The object of the invention is to provide an improved hopple of this character which can be easily applied and removed by a person understanding its peculiar features of construction and operation which require for its application and removal a certain series of movements, any possibility of removal by an unauthorized person unacquainted with the requisite series of movements being thereby effectually precluded.

Another important object is to provide an improved hopple of this character which plays easily around the leg of the animal above the hoof and which will not chafe or bruise.

Another object is to provide a hopple of this character of simple and durable construction, reliable in operation, and easy and inexpensive to manufacture.

Other objects and advantages of the invention reside in certain novel features of construction, combination and arrangement of parts which will be hereinafter more fully described and particularly pointed out in the appended claims, reference being had to the accompanying drawings, in which:

Figure 1 is an elevational view of a preferred embodiment of my invention assembled; and Fig 2 is a similar view of the hopple disassembled, one of the units of the hopple being shown partly in perspective.

Referring to the drawings, it will be seen that the invention contemplates a pair of units or devices indicated respectively at B and C. The device B is adapted to be placed on one leg of the animal and the device C is adapted to be placed on the opposite leg.

Each of the units or devices include a cuff 5 which is adapted to encircle the leg of the animal above the fetlock. The cuff 5 conforms generally to the contour of the leg of the animal except that its ends are extended outwardly, as indicated at 6, and are spaced from each other to provide for the placing and removal of the cuff. The extremities of these ends are bent back upon the cuff to form eyes 7. A chain 8 is carried by one of the eyes 7 and a long link 9 is carried by the other of said eyes of the cuff. A ring 10 is carried by the outer end of the chain 8.

The chain 8 consists of a plurality of links of similar construction, the inner end link 11 of which extends through the eye 7 and thereby secures the chain to the cuff. The ring 10 is carried by the outer end of the link 12. One of the links of the chain, preferably the link adjacent the end link 11 carries an extra link 13 which constitutes a combined stop and centering link.

In practice, the cuff 5 of the device B is placed in position on the leg of the animal. The long link 9 is then passed through the combined stop and centering link 13. The ring 10 of the device B and the link 12 and the intermediate links of the chain 8 are then passed through the long link 9. This completes the assembly of the device or unit B of the hopple. The long link 9 of the device C is then led through the ring 10 of the device B, the cuff 5 and the links of the chain 8 of the device C being pulled through the ring 10 of B after the link 9 until the ring 10 of the device C engages the ring 10 of the device B. Then place the cuff 5 of the device C around the other leg of the animal. Pass the long link 9 of the device B through the combined stop and centering link 13 thereof. Then pass the long link 9 through the ring 10 of the device B and slip it over the ring 10 of the device C and bring it back over the links of the chain 8 to the position shown in Fig. 1. This completes the assembly. To remove the hopple, it is only necessary to reverse this operation.

An important feature of the present invention resides in the action of the combined stop and centering link in the organization presented by this link, the long link 9 and the other elements of the hopple. As may be seen in Fig. 1 the link 13 extends through and is carried by one of the links of the chain 8. This limits the movement of the link 13. The long link 9 extends through and is received by the link 13 while the long link 9 itself receives the chain 8 and engages the link of the chain which carries the link 13. This arrangement gives to the link 13 the function of centering the device whereby the line of pull exerted by the chain 8 is constrained to act radially of the cuff, thus making the pull on the leg of the animal direct and eliminating all tangential pull or such component forces of the pull that tend to rotate the cuff on the leg of the animal and thereby chafe and bruise the same. The other function of the link 13 is that it limits the approach of the link 9 and the links of the chain to the leg of the animal and in these respects functions as a stop. It is to be noted that in the absence of the link 13 or of equivalent means the pull of the chain would act to draw the link 9 and the end links of the chain toward the leg of the animal to thereby bind and bruise the animal.

It is obvious that one of the hopples may be used on a picket chain or drag, if desired.

I claim:

1. A hopple including a cuff adapted to encircle the leg of the animal and having an eye formed on each of the adjacent ends, a chain consisting of a plurality of links and having one end link secured in one of the eyes of said cuff, a ring carried by the outer link of said chain, a long link carried by the other of said eyes on said cuff and through which said chain and said ring are adapted to pass, and a combined stop and centering link carried by one of the links of said chain and receiving the long link to limit the approach of the point of engagement of the long link and chain toward the leg of the animal and to constrain the pull of the chain to be exerted substantially radially of the cuff.

2. A hopple including a cuff adapted to encircle the leg of the animal, a chain consisting of a plurality of links secured to said cuff, a ring carried by said chain, a long link carried by said cuff and through which said chain and said ring are adapted to pass, and a combined stop and centering link carried by one of the links of said chain and receiving the long link to limit the approach of the point of engagement of the long link and chain toward the leg of the animal and to constrain the pull of the chain to be exerted substantially radially of the cuff.

3. A hopple including a cuff adapted to encircle the leg of the animal, a chain consisting of a plurality of links carried by said cuff, a long link carried by said cuff and through which said chain is adapted to pass and a combined stop and centering link carried by one of the links of said chain and receiving said long link, all as and for the purposes set forth.

ELLIS ERVIN HIGLEY.